H. Y. Scattergood.
Cotton Gin
No. 3,013. Reissued Jun. 30, 1868.
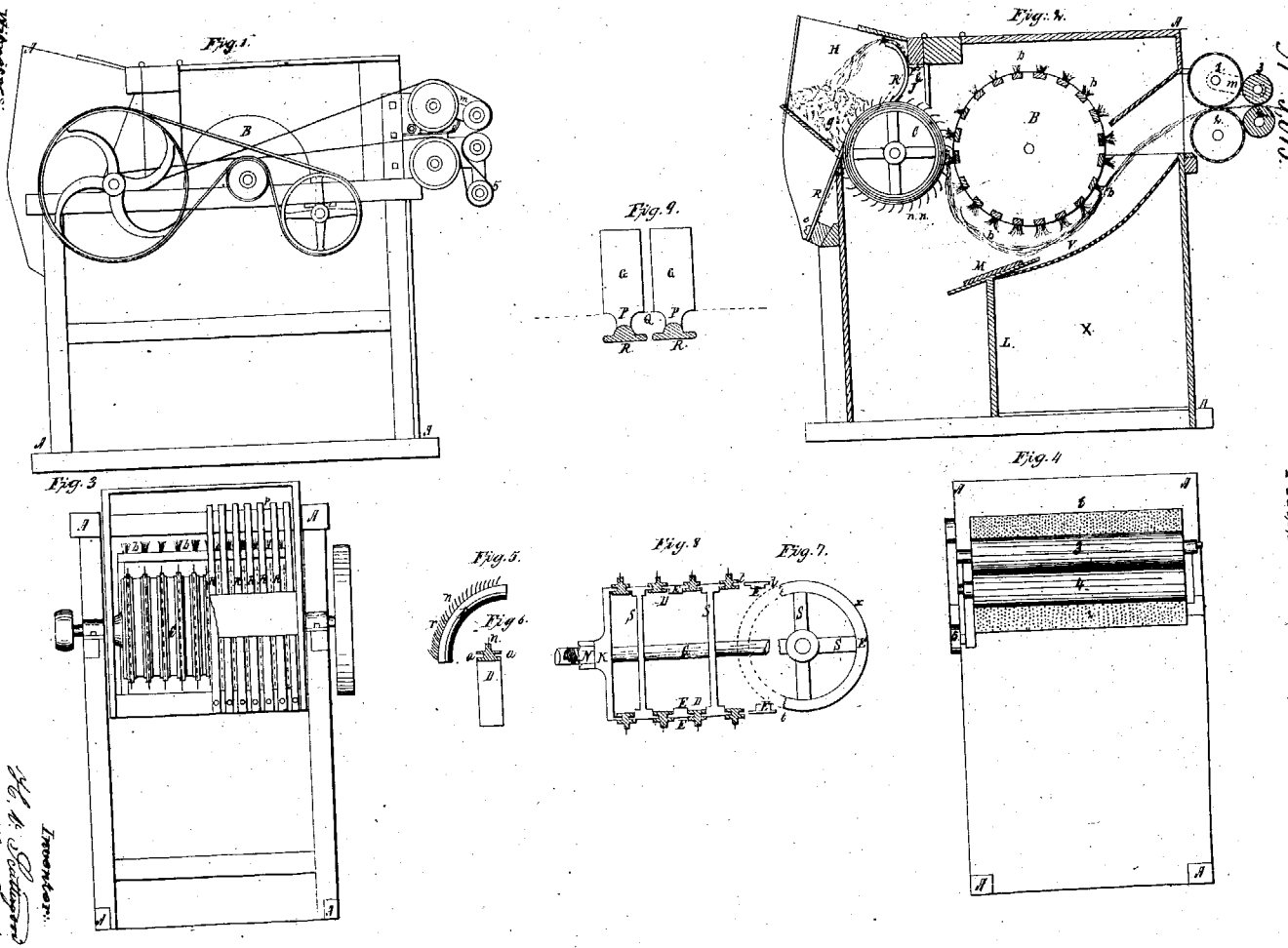
Witnesses:
Chas. Geo. Harold
E. Frank H. Smith
Inventor:
H. Y. Scattergood
per L. W. Serrell Atty.

UNITED STATES PATENT OFFICE.

HENRY VALENTINE SCATTERGOOD, OF ALBANY, NEW YORK.

IMPROVEMENT IN COTTON-GINS.

Specification forming part of Letters Patent No. 66,202, dated June 25, 1867; Reissue No. 3,013, dated June 30, 1868.

*To all whom it may concern:*

Be it known that I, HENRY VALENTINE SCATTERGOOD, of the city of Albany, State of New York, have invented certain Improvements in the Construction of Cotton-Gins; and I declare the following specification, with the drawings forming part thereof, to be a full and complete description of my invention.

Figure 1 represents the gin in profile, with its pulleys and belts in place. Fig. 2 is a vertical section through its length, showing the arrangement of the machinery. Fig. 3 is a front view of the machine, with the covering to the machinery removed to show it. Fig. 4 is a rear view of the machine, showing the condensing machinery as attached to it; and Figs. 5, 6, 7, 8, and 9 are sectional views of the parts of the improved machinery.

Similar letters denote the same parts of the apparatus.

The nature of my said invention consists in forming the teeth of a cotton-gin of finished and tapering needle-pointed wires set obliquely to the radial lines of the ginning-cylinder, so as to seize and draw away from the seeds the cotton or lint without injuring the staple. I also construct my cylinder of a series of separate rings or segments of rings, so that one portion can be removed, if injured; and I employ a condenser for receiving the cotton and allowing the air from the brush or blower to pass away, said condenser being formed of a cylinder or cylinders with a smooth perforated surface, to which the cotton will not adhere, as with the wire-cloth cylinders heretofore employed.

In the drawings, A is the frame of the machine, formed in any usual manner. C is the ginning-cylinder; R, the guard or range of ribs; B, the brush-cylinder or blower, with its brushes *b*, as usual. The ginning-cylinder is formed with circular ranges of teeth, and each tooth is made of wire, with a smooth-finished tapering needle-point, so as to take hold of the cotton and draw the same away from the seeds without injuring the staple. The teeth are to be set obliquely to the radii of the cylinder, as at *r r*, Fig. 5, or formed with their points curved forward, as at *n w*, Fig. 5. To make my cylinder both strong, light, and true, I provide a series of rings, E, having arms S, Fig. 7, fitted to be set upon the shaft G of the ginning-cylinder, and between these I introduce my ranges of teeth, secured in a curved metal stock or base, D. These toothed stocks are to be formed either as complete rings or as sections or segments of rings, and made by casting type-metal or other suitable metal around the lower ends of the said wire teeth. In the sides of these rings or segments I form grooves *a a*, as represented in Figs. 6 and 8, to receive the flanges *t* of the rings E and the corresponding flanges on the cylinder-heads; or ribs might be formed on the bases of the teeth, and the rings E and the cylinder-heads be made with grooves to receive the same. One or both heads of the cylinder are made movable, and set up by a screw or wedge to clamp the segments and rings firmly together, and produce a perfect strong and light and true ginning-cylinder. It is manifest that this construction will produce a light and strong cylinder, and at the same time admit of easy and quick repairs in case of injury to any of the rings carrying the ranges of teeth. In that case, by loosening the nut and drawing back the cylinder-head the rings may be separated, the injured part removed, and a new section introduced, the head replaced and screwed up ready for service without removing the cylinder from the machine.

The ribs in the gins now in use are generally formed in reference to their profile, as shown by the dotted red lines in Fig. 2, commencing at the lower girt of the hopper at *e*, and extending to the upper girt at G′, where their upper ends are fastened. It will be seen that at the upper angle of the space behind this style of rib there is a place where the lint, carried upward by the operation of the teeth upon the cotton in the hopper, may collect and pack. This frequently occurs, retarding and often entirely stopping the movement or rolling of the cotton in the hopper, compelling the operator to stop the gin and clear away the obstruction. The form and arrangement of ribs in my machine are intended to obviate this difficulty. These ribs are shown in profile at Fig. 2, in front view in Fig. 3, and in cross-section, (of full size,) as seen from above, in Fig. 9. It will be seen that I give the middle part of the ribs, from their point *g*, where they become tangent to the cylinder, a curved form, and carry that curve back above the cylinder, and then give to the ribs a reflex curve upward and forward, as shown in the Fig. 2. The ribs are secured at their bottom ends to the lower girt, *e*, of the hopper, and at their upper ends to the upper girt by means of a brace, G′, (see Fig. 9,) fastened to the lower surface of the girt, the brace and rib being connected by a narrow neck, P, holding the rib a small space off from the girt. The use of this narrow neck is to leave between contiguous ribs a space, Q, for the passage of the lint upward behind said ribs, issuing at last from between said ribs and the point *p*, Figs. 2 and 3, and re-entering the hopper. By this double curve of the ribs I carry that part which is over the cylinder farther back than usual, thereby exposing the cotton to the action of a greater number of teeth than in other gins, consequently enabling the machine to do more work at every revolution of its cylinder. For the purpose of cleansing the lint more perfectly from the dirt and dust, which cannot be entirely removed by the action of the brushes, and which, in existing machines, driven by the wind of the brushes, pass with the lint to the condensing-roll, and become there incorporated with the bat of cotton as it is formed, I provide a space between the mote-board M and the back part of the frame, which is inclosed, making a tight box or dead-air chamber, and I cover it with a screen or smooth surface freely perforated. (See V, Fig. 2.) The effect of this arrangement is that the lint thrown down by the brushes upon the mote-board is carried along the screen, and, there being no current of air from the dead-air chamber to carry along the particles of dust and dirt, they fall through the screen into the chamber. However, if preferred, this casing might be dispensed with, the air and dust passing out through the screen V.

The "condenser," so called because by it the loose flock or lint delivered from the brush-blower is collected and formed into a compact bat, is constructed as follows: In ordinary machines the lint is passed to a hollow cylinder, extending across the machine at some distance behind the brush-cylinder or blower, and which cylinder is formed of wire-cloth, upon which the lint passes. This kind of covering gives the bat a coarse, uneven appearance, and there is difficulty in separating the cotton from such wire-cloth. To avoid this difficulty I employ one or more condensing rollers or cylinders formed with a smooth surface perforated with small holes. For this I prefer sheet metal with numerous small holes punched in it; but hard rubber or other material that possesses sufficient strength and can be formed with a smooth surface capable of being perforated with numerous small holes without leaving rough edges or projections to catch the cotton or lint may be employed. I have represented two such condensing-rollers, 1 and 2, Fig. 2, with their doffing or delivery rollers 3 and 4. The rollers 2 and 4 should be set in stationary boxes, while the rollers 1 and 3 are allowed to rise and accommodate the thickness of the bat. The pair of rollers 3 and 4 are of wood with smooth surfaces about two inches in diameter. The roller 4 runs in stationary boxes, and the condenser-roller 1 has a free movement up and down. The roller 3 runs in arms *m*, which hang from the axis of the condensing-roller 1, and can turn thereon as the roller 3 rises or falls. The object of this is that the roller 3 may always maintain the same distance from the condenser, so that it will never fail to take the lint from No. 1, no matter how far the rollers 3 and 4 may be separated by the thickness of the bat between them. The rollers 1 and 3 are to be pressed downward by suitable springs, *x*, fastened to the frame of the machine.

I consider the advantages of the combined improvements to be these: First, by the form of the needle-pointed teeth, and the mode of placing them upon the cylinder, the points present themselves first, and, as the perfectly round, smooth body of the tooth comes forward, there is a gentle drawing movement upon the cotton, which separates the lint from the seed without injury to the staple; second, the mode of constructing the cylinder gives a simple way of fitting the needle-pointed teeth to its surface, and a prompt, economical way of repairing damage thereto; third, by the mode of forming the ribs a greater surface of the cotton roll in the hopper is exposed to the operation of the teeth, and a greater number of teeth are acting at once upon the roll, keeping up its motion and separating the lint from the seeds without injury to the staple; fourth, by the mode of securing the upper part of the ribs to the frame without obstructing the space for the lint to pass back into the hopper, the clogging of the machine and the delays in operating it are prevented; fifth, by the dead-air chamber and its perforated screen all dirt and foreign matter are removed before the lint reaches the condenser; sixth, by forming the condenser roller or cylinder with a smooth perforated surface instead of wire-cloth, the bat when it comes from the machine is complete.

What I claim, and desire to secure by Letters Patent, is—

1. A ginning-cylinder formed with circular ribs or projections containing or supporting the teeth, said ribs or projections being elevated above the other portions of the surface of the ginning-cylinder, and thus leaving grooves for the reception of the guards, substantially as specified.

2. Forming the ginning-cylinder of a series of rings, between which rings or segments of rings containing teeth are secured, substantially as specified.

3. In combination with a cylinder carrying circular ranges of needle-pointed teeth, the guards R, formed with openings to their upper ends, as and for the purposes specified.

4. Attaching the delivering or doffing roller upon arms extending from the axis of the perforated condensing roller or cylinder, so that said delivery-roller is allowed to rise and accommodate the thickness of the bat, and is kept properly in contact with the condensing-cylinder, as set forth.

5. In combination with the condensing roller or rollers formed with smooth perforated surfaces, the screen V and brush-blower B, for conveying the cotton to the condenser, as specified.

6. A condensing roller or rollers formed of smooth perforated surfaces, in combination with a ginning-cylinder and a brush-blower to pass the cotton fiber from the said cylinder to the said roller or rollers, substantially in the manner and for the purpose above described.

In witness whereof I have hereunto set my signature this 25th day of November, 1864.

HENRY V. SCATTERGOOD.

In presence of—
JOEL TIFFANY,
EDWARD WADE.